US006916126B2

(12) United States Patent
Lin et al.

(10) Patent No.: US 6,916,126 B2
(45) Date of Patent: Jul. 12, 2005

(54) DEVELOPING METHOD FOR SEMICONDUCTOR SUBSTRATE

(75) Inventors: Chen Tang Lin, Hsinchu (TW); Chung Chih Yeh, Hsinchu (TW); Ko Wei Peng, Hsinchu (TW); Ming Feng Wu, Hsinchu (TW)

(73) Assignee: Mosel Vitelic, Inc., Hsinchu (TW)

( * ) Notice: Subject to any disclaimer, the term of this patent is extended or adjusted under 35 U.S.C. 154(b) by 0 days.

(21) Appl. No.: 10/817,567

(22) Filed: Apr. 1, 2004

(65) Prior Publication Data

US 2005/0063699 A1 Mar. 24, 2005

(30) Foreign Application Priority Data

Sep. 23, 2003 (TW) ........................................ 092126264

(51) Int. Cl.[7] ................................................ G03B 27/42

(52) U.S. Cl. ....................... 396/604; 396/611; 396/626; 118/52; 427/240; 134/32; 134/157

(58) Field of Search ................................ 396/604, 611, 396/626; 134/3, 32, 157; 118/52, 319–321

(56) References Cited

U.S. PATENT DOCUMENTS

| | | | | |
|---|---|---|---|---|
| 5,893,004 A * | 4/1999 | Yamamura | .................. | 396/611 |
| 6,203,218 B1 * | 3/2001 | Omori et al. | ............... | 396/611 |
| 6,759,179 B1 * | 7/2004 | Phan et al. | ................ | 430/311 |

* cited by examiner

*Primary Examiner*—D. Rutledge
(74) *Attorney, Agent, or Firm*—Townsend and Townsend and Crew LLP

(57) ABSTRACT

Embodiments of the present invention provide a developing method, which can efficiently prevent the developing solution from remaining on the backside surface of the wafer, so as to avoid the influence of the contamination on the subsequent processes. In one embodiment, a developing method comprises providing a wafer in a reaction space, wherein the wafer has an exposed photoresist thereon; coating a developing solution on a surface of the wafer; rotating the wafer; rinsing a normal surface and a backside surface of the wafer; and stopping rinsing the normal surface of the wafer while keeping rinsing the backside surface of the wafer for a specific time period.

21 Claims, 4 Drawing Sheets

DEVELOPING METHOD FOR SEMICONDUCTOR SUBSTRATE

CROSS-REFERENCES TO RELATED APPLICATIONS

This application claims priority from R.O.C. Patent Application No. 092126264, filed Sep. 23, 2003, the entire disclosure of which is incorporated herein by reference.

BACKGROUND OF THE INVENTION

The present invention relates to a developing method and, more particularly, to a developing method for preventing developing a developing solution from remaining on the backside surface of a wafer.

The photolithography technique has broadly been applied in the manufacture of a semiconductor device. The principal steps of the photolithography process are as follows. First, a photoresist is coated on one surface of a wafer, then, a pattern is transferred to the photoresist and a developing process is performed. In the developing process, it is essential to send a wafer having exposed photoresist to a developing coating apparatus. FIG. 1 illustrates the structure of a traditional developing coating apparatus. As shown in FIG. 1, the traditional developing coating apparatus mainly comprises a spin chuck 11, a cup 12, an outer wall 13, a developing solution nozzle 14 and washing solution nozzles 15, 17. The spin chuck 11 is disposed in a reaction space of the developing coating apparatus, and the spin chuck 11 is equipped with a vacuum pump, not shown, for retaining the wafer 2 on the spin chuck 11. Additionally, the spin chuck 11 is connected to a rotation shaft of a motor, not shown, and raised or lowered by an elevator or lift mechanism. The motor, the elevator mechanism and the vacuum pump are all connected to an outer controller, not shown, for operating and controlling the spin chuck 11. The outer wall 13 surrounds the spin chuck 11 to form a reaction space. An exhaust passage 16 is placed at the bottom of the outer wall 13. The cup 12 is disposed in the reaction space formed by the outer wall 13 wherein the spin chuck 11 is disposed substantially in the center of the reaction space. Further, the cup 12 has a first inner wall 121 and a second inner wall 122. As a result, there is a ring groove 123 formed between the first inner wall 121 and the second inner wall 122. The developing solution nozzle 14 and the first washing solution nozzle 17 are disposed on the upper side of the spin chuck 11 for providing the required developing solution and washing solution respectively to the wafer 2 in the developing process. The second washing solution nozzle 15 is disposed on the cup 12 and near the second inner wall 122 for providing the washing solution to wash the backside surface of the wafer 2.

In some embodiments of the developing processes, the washing solution, e.g., pure water substantially, sprayed by the washing solution nozzle cannot totally remove the remaining developing solution on the backside surface of the wafer 2. The main reason is that the first inner wall 121, the second inner wall 122 and the ring groove 123 cannot completely prevent the developing solution from flowing through the gap between the backside surface of the wafer 2 and the cup 12, whereby a portion of the developing solution will still remain on the backside surface of the wafer 2. Although the conventional method employs the second washing solution nozzle 15 to wash the backside surface of the wafer 2, the washing solution sprayed by the second washing solution nozzle 15 still cannot wash the remainder of the developing solution while the developing solution passes the second washing solution nozzle 15 and flows into the spin chuck 11. It results in the dead zone for washing. Using only the second washing solution nozzle 15 to wash the contamination on the backside surface of the wafer will cause the outer-radiating water mark at the edge of the backside surface of the wafer. It leads to not efficiently preventing the contamination remainder.

In order to further reduce the problem of developing solution remaining on the backside surface of the wafer, there are some prior arts proposed but the efficiency is still limited. For example:

(1) Checking and Washing Step by Step

The method requires each wafer to be taken out for inspection after the developing process is completed. If it has contamination remaining on the wafer, the backside surface of the wafer would be washed again and again. Nevertheless, it often washes the wrong surface if operators have a misoperation, and then the circuits of the normal surface of the wafer will be destroyed. Moreover, the contamination on the backside surface of the wafer will be misjudged or missed if the wafer is inspected only visually. It may adversely affect the subsequent processes.

(2) Reducing the Supply Quantity of the Developing Solution

This method reduces the quantity of the developing solution flowing to the backside surface of the wafer. However, the process quality of the wafer will be influenced as the quantity of the developing solution is reduced to a specific value. As a result, it is hard to control an adequate quantity of the developing solution.

(3) Improving the Developing Coating Apparatus

The method emphasizes the hardware design of the developing coating apparatus. For example, the design may adjust the gap of the cup 12 between the first inner wall 121 and the backside surface of the wafer 2. Yet it may cause the developing solution to flow backward and pollute the backside surface of the wafer 2. If the quantity of the developing solution is sufficiently large, the gap still cannot prevent the developing solution from flowing through the gap between the first inner wall 121 and the wafer 2. Although the ring groove 123 between the first inner wall 121 and the second inner wall 122 can block portion of the developing solution, the excess developing solution will still further pass the second washing solution nozzle 15 and flow into the spin chuck 11 as the quantity is sufficiently large. If the developing solution flows into the spin chuck 11, the second washing solution nozzle 15 cannot work well. It leads to the dead zone for washing.

(4) Improving the Process

Although the adequate parameters can be obtained from the process, it would not still prevent the developing solution from remaining on the backside surface of the wafer for the wrong parameters used by the operator and the same parameters used in a different developing coating apparatus.

Therefore, how to provide a developing method to avoid the abovementioned disadvantages and prevent the developing solution from remaining on the wafer 2 efficiently is an important problem to solve.

BRIEF SUMMARY OF THE INVENTION

Embodiments of the present invention provide a developing method, which can efficiently prevent the developing solution from remaining on the backside surface of the wafer, so as to avoid the influence of the contamination on the subsequent processes.

In accordance with an aspect of the present invention, a developing method comprises providing a wafer in a reaction space, wherein the wafer has an exposed photoresist thereon; coating a developing solution on a surface of the wafer; rotating the wafer; rinsing a normal surface and a backside surface of the wafer; and stopping rinsing the normal surface of the wafer while keeping rinsing the backside surface of the wafer for a specific time period.

In some embodiments, the reaction space is within a developing coating apparatus. Rotating the wafer comprises increasing a rotating rate of the wafer. The method may further include stopping rotation of the wafer for a period to perform a developing step on the wafer before increasing the rotating rate of the wafer from a low speed to a high speed. Rotating the wafer comprises increasing the rotating rate of the wafer from a low speed of about 30–90 rpm to a high speed of about 1000–4000 rpm. The method may further comprise exhausting the reaction space while rotating the wafer. Rinsing the backside surface of the wafer is performed by a nozzle disposed near the backside surface of the wafer. The nozzle is disposed to direct a solution to the backside surface of the wafer at an incident angle of substantially less than about 90 degrees relative to the backside surface of the wafer. The specific time period of stopping rinsing the normal surface of the wafer and keeping rinsing the backside surface of the wafer is at least about five seconds. Rotating the wafer comprises rotating the wafer at a sufficiently low speed while coating the developing solution on the surface of the wafer to form a fluid wall to prevent the developing solution from flowing to at least a portion of the backside surface of the wafer.

In accordance with another aspect of the invention, a method for reducing contamination formed on a backside surface of a wafer comprises providing a wafer in a reaction space, wherein the wafer has an exposed photoresist thereon; coating a developing solution on a surface of the wafer; rotating the wafer and exhausting the reaction space while rotating the wafer; rinsing a normal surface and a backside surface of the wafer; and stopping rinsing the normal surface of the wafer and while keeping rinsing the backside surface of the wafer for a specific time period, thereby reducing the contamination forming on the backside surface of the wafer.

In accordance with another aspect of the present invention, a developing method is applied in a developing coating apparatus comprising a chuck, at least one nozzle and a groove. The method comprises providing a wafer and supporting the wafer on the chuck of the developing coating apparatus with a backside surface of the wafer facing the groove, wherein the wafer has exposed photoresist thereon; coating a developing solution on a surface of the wafer; rotating the wafer and exhausting the developing coating apparatus to form a water wall between the wafer and an outer sidewall of the groove; rinsing a normal surface and rising the backside surface of the wafer by the at least one nozzle; and stopping rinsing the normal surface of the wafer and keeping rinsing the backside surface of the wafer for a specific period, thereby removing contamination remaining on the lower surface of the wafer.

DETAILED DESCRIPTION OF THE INVENTION

Figure 1:
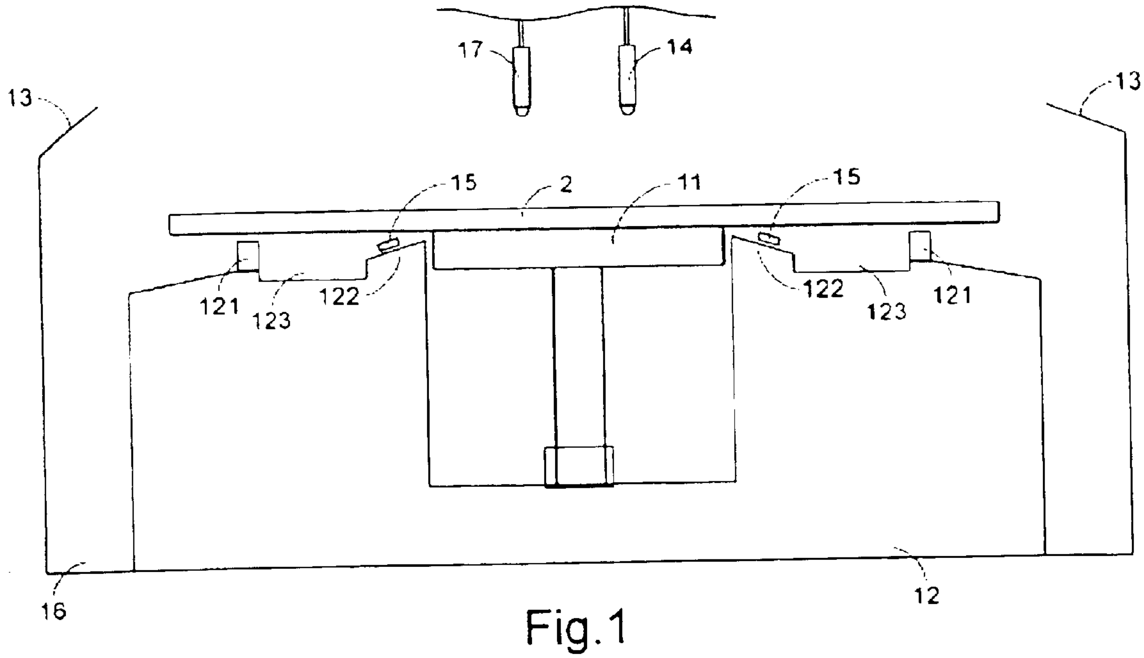
Fig.1 Prior Art
FIG. 1 is an schematically perspective view showing a traditional developing coating apparatus.

Embodiments of the present invention provide a developing method to prevent the developing solution from remaining on the backside surface of the wafer. The method can be applied in any kind of developing coating apparatus. Embodiments of the present invention will now be described conveniently with reference to the developing coating apparatus shown in FIG. 1 as an example.

Figure 2:
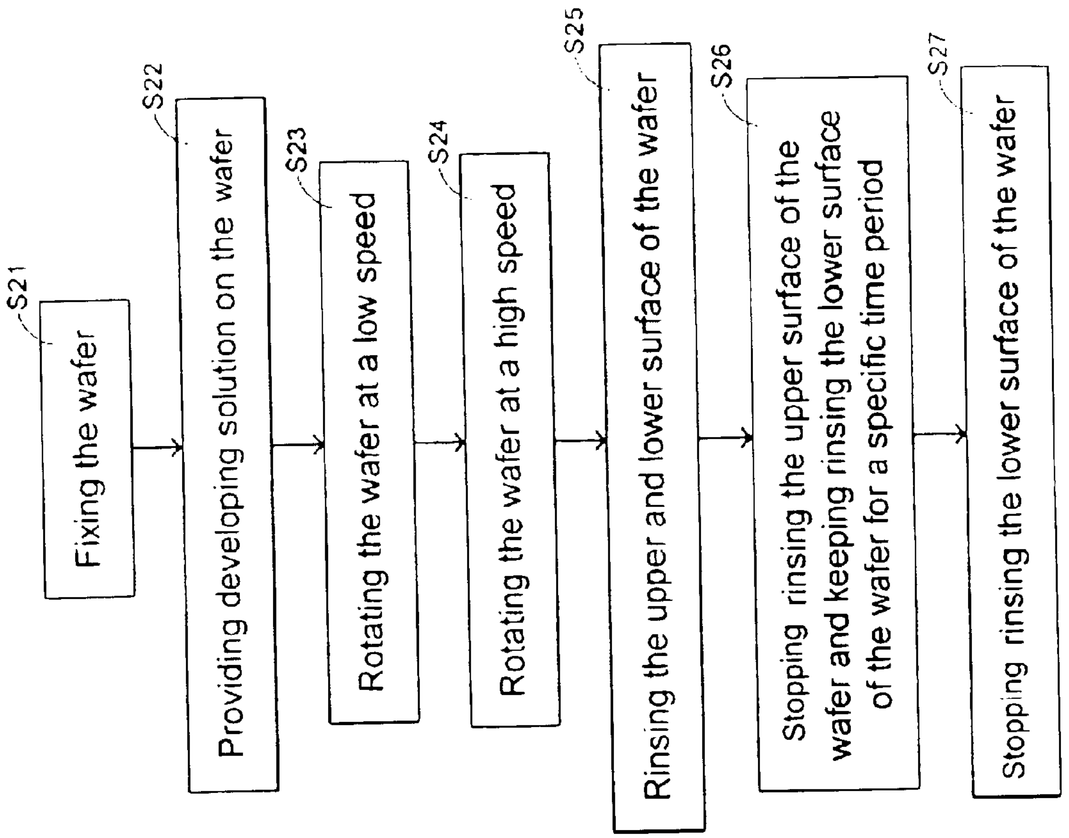
FIG. 2 is a flow chart showing a method according to one embodiment of the present invention.

FIG. 2 shows the flow chart of a developing method according to an embodiment of the present invention. Before the developing process is performed, a wafer is coated with a photoresist, and a pattern is transferred to the photoresist by exposing. Then, the exposed wafer 2 is transferred from an exposing apparatus to a developing coating apparatus shown in FIG. 1 by a conveying arm. After that, the wafer 2 is disposed on the spin chuck 11 and retained on the spin chuck 11 by a vacuum pump (step 21). The developing solution is then provided through the developing solution nozzle 14 to coat the wafer 2 (step 22) while the wafer 2 is rotated at a low speed (step 23). Then, the rotation is stopped for a certain period to perform a developing step on the wafer 2. Afterwards, the wafer 2 is rotated at a high speed (step 24). Meanwhile, the normal surface and the backside surface of the wafer are respectively washed by solutions provided by the first washing solution nozzle 17 and the second washing solution nozzle 15 (step 25). The developing solution on the normal surface (or called "upper surface") of the wafer 2 will be removed, and the developing solution will be prevented from remaining on the backside surface (or called "lower surface") of the wafer 2. Then, the solution flow from the first washing solution nozzle 17 is stopped to cease washing the normal surface of the wafer 2 and the solution flow from the second washing solution nozzle 15 is maintained to keep washing the backside surface of the wafer 2 for a specific time period (step 26). Subsequently, the solution flow from the second washing solution nozzle 15 is also stopped and the developing process is completed (step 27).

In the above embodiment, the rotating rate of the wafer at low speed in step 23 is preferably between about 30 and 90 rpm, and the rotating rate of the wafer in high speed in step 24 is preferably between about 1000 and 4000 rpm. Moreover, the time for rotating the wafer can also be increased or otherwise adjusted.

Additionally, an incident angle of the second washing solution nozzle 15 to the backside surface of the wafer is substantially less than 90 degrees as preferred. In the two steps of rinsing the backside surface of the wafer, the specific time period of continuously rinsing the backside surface of the wafer with the second washing solution nozzle is about five seconds in one preferred embodiment.

Figure 3:
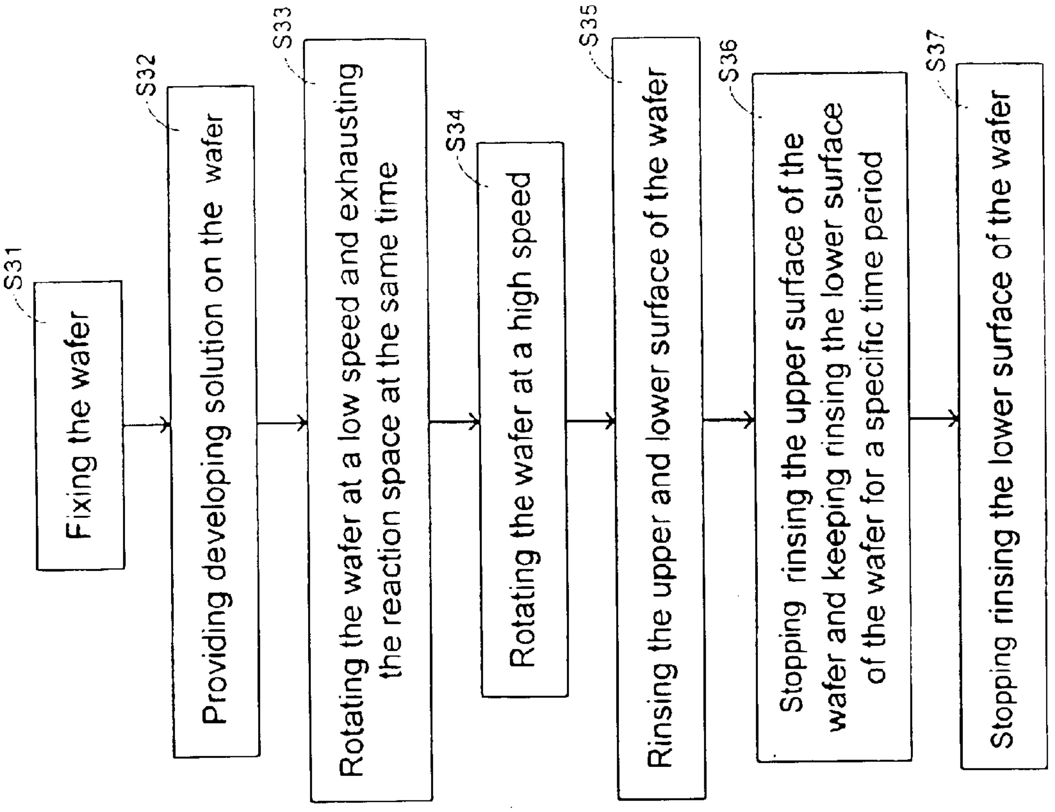
FIG. 3 is a flow chart showing a method according to another embodiment of the present invention.

FIG. 3 shows a flow chart of a developing method according to another embodiment of the present invention. Similarly, before the developing process is performed, a wafer is coated with a photoresist, and a pattern is transferred to the photoresist by exposing. Then, the exposed wafer is also transferred from an exposing apparatus to a developing coating apparatus shown in FIG. 1 with the conveying arm. After that, the wafer 2 is disposed on the spin chuck 11 and retained on the spin chuck 11 by a vacuum pump (step 31). The developing solution is then provided by the developing solution nozzle 14 to coat the wafer 2 (step 32). Meanwhile, the wafer is rotated at a low speed and the reaction space is exhausted by the vacuum pump (step 33). Then, the rotation is stopped for a certain period to perform a developing step on the wafer 2. Afterwards, the wafer 2 is rotated at a high speed (step 34), meanwhile, the normal (upper) surface and the backside (lower) surface of the wafer are respectively washed by the first washing solution nozzle 17 and the second washing solution nozzle 15 (step 35). The developing solution on the normal surface of the wafer 2 will be removed and the developing solution will be prevented from remaining on the backside surface of the wafer 2. Then, the solution flow from the first washing solution nozzle 17 is stopped to cease washing the normal surface of the wafer 2 and the second washing solution nozzle 15 is maintained to keep washing the backside surface of the wafer 2 for a specific time period (step 36). Subsequently, the solution flow from the second washing solution nozzle 15 is also stopped and the developing process is completed (step 37).

Figure 4:
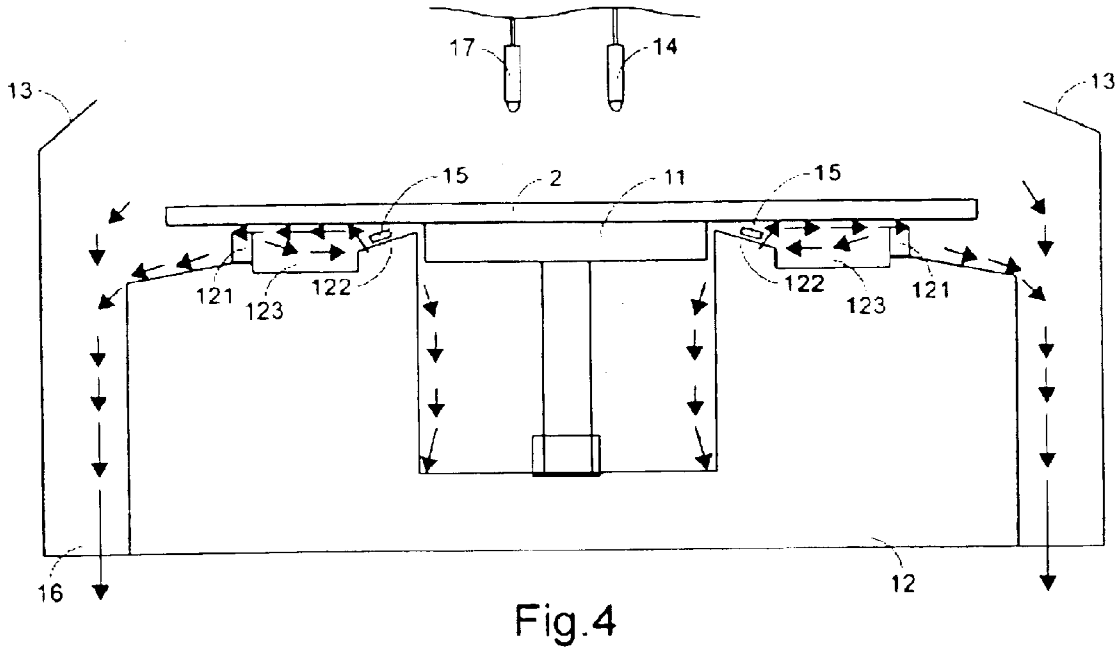
FIG. 4 is perspective view showing the direction of the air flow while the developing coating apparatus is exhausted.

In the above embodiments, the washing solution sprayed by the washing solution nozzle can be substantial pure water. Additionally, the step of exhausting the reaction space can cause the flowing air flow in a specific direction in the reaction space of the developing coating apparatus. Furthermore, an outward-flowing field is formed between the backside surface of the wafer 2 and the cup 12 as shown by the directional arrows in the FIG. 4. The outward-flowing field can be used to prevent the developing solution from flowing into the area between the backside surface of the wafer 2 and the cup 12. Moreover, when the developing solution is provided, a water wall can be formed in the gap between the first wall 121 and the backside surface of the wafer 2 if the wafer 2 is rotated at the low speed, so as to further prevent the developing solution from flowing through the gap and remaining on the backside surface of the wafer 2. Thus, it is not easy for the developing solution to flow. Further, with the two steps of rinsing the wafer, the remainder of the developing solution on the backside surface of the wafer will be removed entirely, so as to prevent the contamination from remaining on the backside surface of the wafer. It does not adversely affect the subsequent process.

While the invention has been described in terms of what is presently considered to be the most practical and preferred embodiments, it is to be understood that the invention needs not be limited to the disclosed embodiment. On the contrary, it is intended to cover various modifications and similar arrangements include within the spirit and scope of the appended claims which are to accord with the broadest interpretation so as to encompass all such modification and similar structures.

What is claimed is:

1. A developing method comprising:

providing a wafer in a reaction space, wherein said wafer has an exposed photoresist thereon;

coating a developing solution on a surface of said wafer;

rotating said wafer;

rinsing a normal surface and a backside surface of said wafer; and stopping rinsing said normal surface of said wafer while keeping rinsing said backside surface of said wafer for a specific time period.

2. A developing method according to claim 1 wherein said reaction space is within a developing coating apparatus.

3. A developing method according to claim 1 wherein rotating said wafer comprises increasing a rotating rate of said wafer.

4. A developing method according to claim 3 further comprising stopping rotation of said wafer for a period to perform a developing step on said wafer before increasing the rotating rate of said wafer from a low speed to a high speed.

5. A developing method according to claim 3 wherein rotating said wafer comprises increasing the rotating rate of said wafer from a low speed of about 30–90 rpm to a high speed of about 1000–4000 rpm.

6. A developing method according to claim 1 further comprising exhausting said reaction space while rotating said wafer.

7. A developing method according to claim 1 wherein rinsing said backside surface of said wafer is performed by a nozzle disposed near said backside surface of said wafer.

8. A developing method according to claim 7 wherein said nozzle is disposed to direct a solution to said backside surface of said wafer at an incident angle of substantially less than about 90 degrees relative to said backside surface of said wafer.

9. A developing method according to claim 1 wherein said specific time period of stopping rinsing said normal surface of said wafer and keeping rinsing said backside surface of said wafer is at least about five seconds.

10. A developing method according to claim 1 wherein rotating said wafer comprises rotating said wafer at a sufficiently low speed while coating said developing solution on said surface of said wafer to form a fluid wall to prevent said developing solution from flowing to at least a portion of said backside surface of said wafer.

11. A method for reducing contamination formed on a backside surface of a wafer, the method comprising:

providing a wafer in a reaction space, wherein said wafer has an exposed photoresist thereon;

coating a developing solution on a surface of said wafer;

rotating said wafer and exhausting said reaction space while rotating said wafer;

rinsing a normal surface and a backside surface of said wafer; and stopping rinsing said normal surface of said wafer and while keeping rinsing said backside surface of said wafer for a specific time period, thereby reducing the contamination forming on said backside surface of said wafer.

12. A method according to claim 11 wherein said reaction space is within a developing coating apparatus.

13. A method according to claim 11 wherein rotating said wafer comprises increasing a rotating rate of said wafer.

14. A method according to claim 11 wherein exhausting said reaction space comprises generating an outward-flowing field at said backside surface of said wafer.

15. A method according to claim 11 wherein rinsing said backside surface of said wafer is performed by a nozzle disposed near said backside surface of said wafer.

16. A method according to claim 15 wherein said nozzle is disposed to direct a solution to said backside surface of said wafer at an incident angle of substantially less than about 90 degrees relative to said backside surface of said wafer.

17. A method according to claim 11 wherein said specific time period of stopping rinsing said normal surface of said wafer and keeping rinsing said backside surface of said wafer is at least about five seconds.

18. A developing method, applied in a developing coating apparatus comprising a chuck, at least one nozzle and a groove, the method comprising:

providing a wafer and supporting said wafer on said chuck of said developing coating apparatus with a backside surface of the wafer facing said groove, wherein said wafer has exposed photoresist thereon;

coating a developing solution on a surface of said wafer;

rotating said wafer and exhausting said developing coating apparatus to form a water wall between said wafer and an outer sidewall of said groove;

rinsing a normal surface and rising said backside surface of said wafer by said at least one nozzle; and stopping rinsing said normal surface of said wafer and keeping rinsing said backside surface of said wafer for a specific period, thereby removing contamination remaining on said lower surface of said wafer.

19. A developing method according to claim 18 further comprising increasing a rotating rate of said wafer prior to rinsing said wafer.

20. A developing method according to claim 18 wherein said nozzle is disposed to direct a solution to said backside surface of said wafer at an incident angle of substantially less than about 90 degrees relative to said backside surface of said wafer.

21. A developing method according to claim 18 wherein said specific time period of stopping rinsing said normal surface of said wafer and keeping rinsing said backside surface of said wafer is at least about five seconds.

* * * * *